July 30, 1929.　　J. A. DAVEY ET AL　　1,722,278
POWER CONNECTION
Filed May 27, 1927　　2 Sheets-Sheet 1
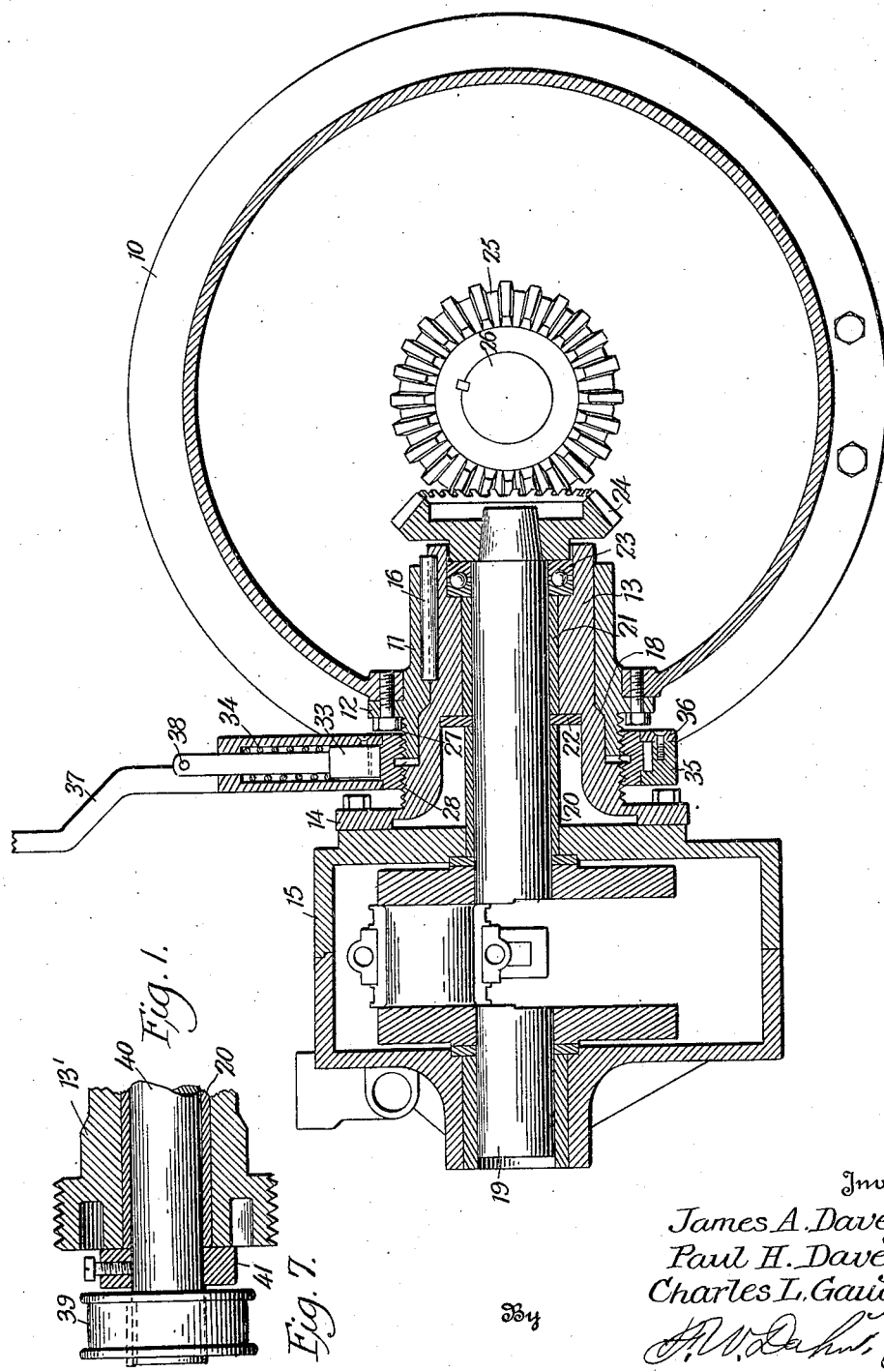
Inventors
James A. Davey,
Paul H. Davey,
Charles L. Gaugler,
By
Attorney

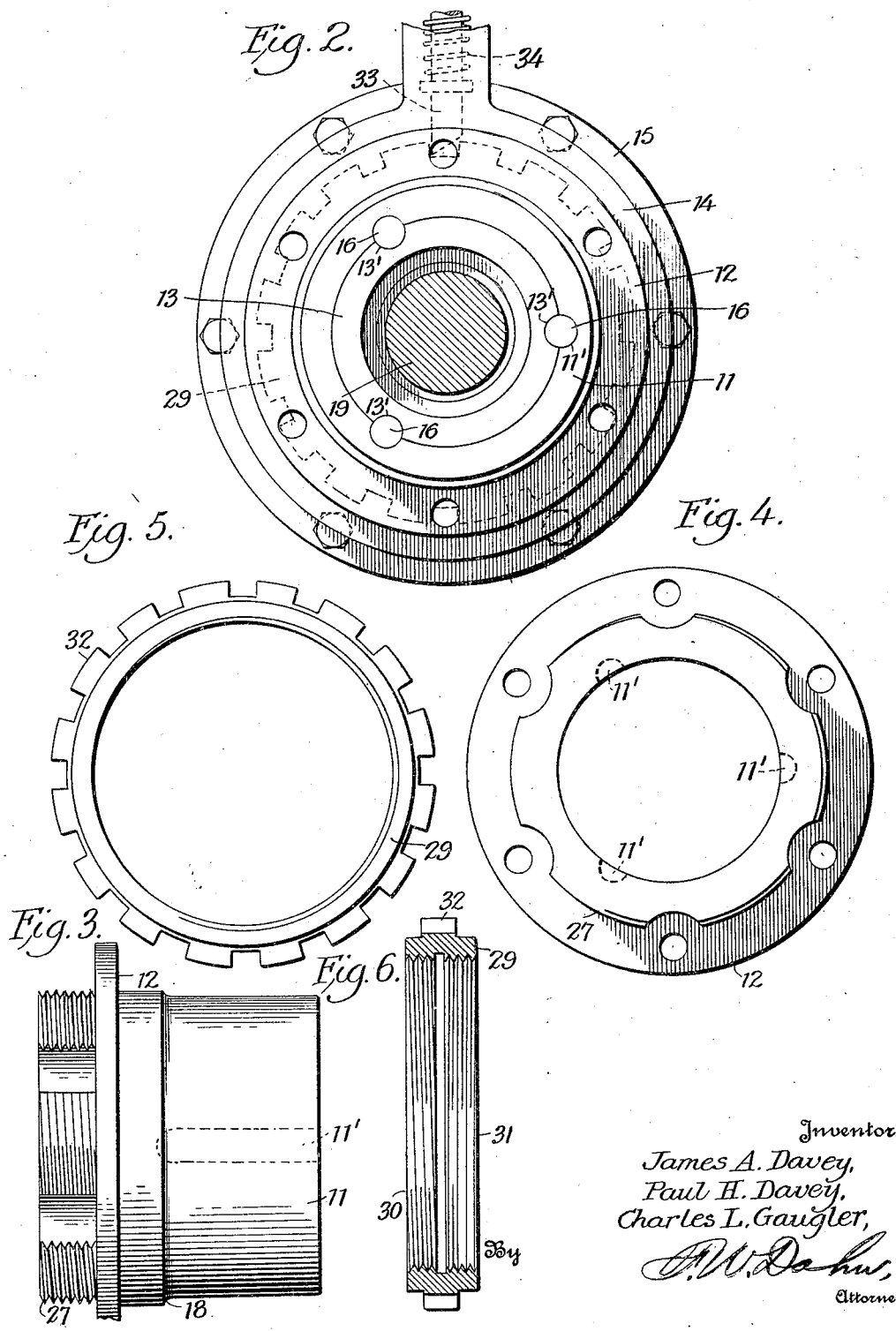

Patented July 30, 1929.

1,722,278

UNITED STATES PATENT OFFICE.

JAMES A. DAVEY, OF SOUND BEACH, CONNECTICUT, AND PAUL H. DAVEY AND CHARLES L. GAUGLER, OF KENT, OHIO; SAID GAUGLER ASSIGNOR TO THE DAVEY TREE EXPERT CO., OF KENT, OHIO, A CORPORATION OF OHIO.

POWER CONNECTION.

Original application filed May 27, 1927, Serial No. 194,704. Divided and this application filed May 27, 1927. Serial No. 194,705.

Our said invention relates to a power connection intended primarily for use with a tractor as illustrated in our application Serial No. 194,704 filed May 27, 1927, of which this application is a division, but capable of general use in many different situations. It is an object to provide a simple and easily operable connection which shall be very strong and durable.

Referring to the drawings in which similar reference characters indicate similar parts:

Fig. 1, is a vertical section showing our invention in one embodiment thereof, in connection with an attachment for tractors, Fig. 2, an enlarged end view of such attachment removed from the tractor, the shaft being in section, Fig. 3, a side elevation of a sleeve, Fig. 4, an end elevation of the same, Fig. 5, an end elevation of a ratchet, Fig. 6, a section of the same, and Figure 7, a detail of a modified form.

In the drawings, reference character 10 indicates a part of the crank case of a tractor, it being understood that this may be a part of any other machine suitable for use with our invention. A sleeve 11 is entered through an opening in the crank case, and is held in place by screws passing through openings in a flange 12 on the sleeve. A cylindrical extension or sleeve 13 on an attachment plate 14 of a compressor housing 15 is slidably mounted in the sleeve, and is held against rotation by splines 16 engaging in coacting slots 11' and 13' of the sleeves, the inward movement of the slidable sleeve being limited by coacting shoulders at 18 on the respective sleeves.

A shaft 19, here shown as the driving shaft of an air compressor, is journaled in bronze bushings 20 and 21 between which is a collar 22 resting against a shoulder of sleeve 13. A ball bearing 23 at the inner end of bushing 21 acts as a thrust bearing for a beveled gear 24 fixed to shaft 19 and adapted to mesh with a beveled gear 25 on a shaft 26 which in this instance is the engine shaft of the tractor.

The sleeve 13 is movable endwise to bring the gears 24 and 25 into or out of mesh by means including oppositely threaded adjacent portions 27 and 28 of sleeves 11 and 13. A ratchet ring 29 has internal right and left threads at 30 and 31 engaging the threads on the sleeves, and ratchet teeth 32 for engagement by a reversible pawl 33 forced downward by a spring 34 in a hollow casing 35 surrounding the ring and held in place by an annular plate 36 closing the casing at one side. A lever 37 serves for actuation of the ratchet in either direction and a thumb-latch of suitable character may have connection to the stem of the pawl by an aperture at 38.

The operation is believed to be obvious, but it may be stated that the lever 37 is oscillated after setting the pawl to turn the ratchet ring in the appropriate direction, whereupon the reversely arranged threads will move the sleeve 13 quickly in the desired direction, to carry the gear 24 toward or away from gear 25, the splines 16 preventing rotation of the sleeve 13.

While our device is intended broadly for use in various situations involving the need for a disconnectible power connection it may be found particularly desirable for use as a power take-off on a Fordson tractor. As is well-known the ordinary power pulley now in use must be put on whenever the tractor is to act as a stationary power plant and removed when the tractor is to be used in ordinary manner, since otherwise the pulley runs continuously and dust and dirt accumulate in the pulley assembly so as to interfere with its proper functioning. Obviously a pulley can readily be mounted on a stub shaft journaled in sleeve 13 and when backed off as above described the pulley will stand still. Such a construction is shown in Fig. 7 where the pulley 39 is fixed to a shaft 40 journaled in a sleeve 13', a collar 41 being interposed between the pulley and the sleeve if desired.

It will be obvious to those skilled in the art that the device of our invention may be modified in various respects and may be used in various situations. Therefore we do not limit ourselves to the specific form shown in the drawings and described in the specification but only as indicated in the appended claims.

Having thus fully described our invention what we claim as new and desire to secure by Letters Patent is:

1. A power connection including a driving shaft, a driven shaft, gears on said shafts, a fixed sleeve, a sleeve in which the driven shaft is journaled said sleeve being slidably mounted in the fixed sleeve, spaced parallel splines engaging registering recesses in said sleeves to prevent relative rotation of said sleeves, and means for moving the driven shaft and its sleeve bodily lengthwise to engage or disengage said gears.

2. A power connection including a driving shaft, a driven shaft, gears on said shafts, a fixed sleeve, a sleeve in which the driven shaft is journaled said sleeve being slidably mounted in the fixed sleeve, means to prevent relative rotation of said sleeves, opposite screw threads on adjacent parts of said sleeves, a ring having threaded engagement with the threads, and means to rotate the ring.

3. A power connection including a driving shaft, a driven shaft, gears on said shafts, a fixed sleeve, a sleeve in which the driven shaft is journaled said sleeve being slidably mounted in the fixed sleeve, means to prevent relative rotation of said sleeves, opposite screw threads on adjacent parts of said sleeves, a ring having threaded engagement with the threads, means to rotate the ring including ratchet teeth on the ring, and a reversible pawl engaging said teeth.

4. A power connection including a driving shaft, a driven shaft, gears on said shafts, a fixed sleeve, a sleeve in which the driven shaft is journaled said sleeve being slidably mounted in the fixed sleeve, means to prevent relative rotation of said sleeves, opposite screw threads on adjacent parts of said sleeves, a ring having threaded engagement with the threads, means to rotate the ring, and coacting shoulders to limit relative longitudinal movement of said sleeves.

5. A power connection including a driving shaft, a driven shaft, a casing through which one of the shafts extends, a sleeve in which said shaft is journaled, opposite screw threads on concentric portions of the casing and the sleeve and a rotatable ring engaging said screw threads whereby rotation of the ring will move the sleeve and its shaft bodily endwise to bring the two shafts into or out of operative relation, and means to prevent relative rotation of said sleeves.

In testimony whereof we affix our signatures.

JAMES A. DAVEY.
PAUL H. DAVEY.
CHARLES L. GAUGLER.